US010155678B2

(12) United States Patent
Murtha, Jr. et al.

(10) Patent No.: US 10,155,678 B2
(45) Date of Patent: *Dec. 18, 2018

(54) DAMPING PLATE SAND FILTRATION SYSTEM AND WAVE ENERGY WATER DESALINATION SYSTEM AND METHODS OF USING POTABLE WATER PRODUCED BY WAVE ENERGY DESALINATION

(71) Applicant: Murtech, INC., Glen Burnie, MD (US)

(72) Inventors: Robert C. Murtha, Jr., Stevensville, MD (US); Michael E. McCormick, Annapolis, MD (US)

(73) Assignee: Murtech, Inc., Glen Burnie, MD (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/409,075

(22) Filed: Jan. 18, 2017

(65) Prior Publication Data
US 2017/0129788 A1    May 11, 2017

Related U.S. Application Data

(63) Continuation-in-part of application No. 15/023,791, filed as application No. PCT/US2014/056243 on Sep.
(Continued)

(51) Int. Cl.
  *B09C 1/00*  (2006.01)
  *C02F 1/28*  (2006.01)
(Continued)

(52) U.S. Cl.
  CPC ............ *C02F 1/441* (2013.01); *B01D 61/025* (2013.01); *B01D 65/08* (2013.01); *B63B 35/44* (2013.01);
(Continued)

(58) Field of Classification Search
  None
  See application file for complete search history.

(56) References Cited

U.S. PATENT DOCUMENTS

| 260,016 A | 6/1882 | Franklin |
| 344,813 A | 7/1886 | Bull |
(Continued)

FOREIGN PATENT DOCUMENTS

| CA | 1193490 | 9/1985 |
| CN | 201620995 | 11/2010 |
(Continued)

OTHER PUBLICATIONS

Bernitsas, et al., "VIVACE (Vortex Induced Vibration for Aquatic Clean Energy): A New Concept in Generation of Clean and Renewable Energy from Fluid Flow," Proceedings of OMAE2006, Paper OMAE06-92645, Hamburg, Germany Jun. 4-9, 2006, pp. 1-18.
(Continued)

*Primary Examiner* — Krishnan S Menon
(74) *Attorney, Agent, or Firm* — Caesar Rivise, PC

(57) ABSTRACT

A potable water producing system for disposition at a salt water body and methods of producing potable water are provided. The system includes a wave energy conversion system (AWECS) and a portable filtration system. The AWECS forms a floating articulated barge having an onboard desalination system including reverse osmosis membranes. The filtration system is a sand filter residing on a damping plate submerged in the salt water body and filters the adjacent salt water for providing filtered salt water to the onboard desalination system. Wave action on the articulated barge provides energy to pump and pressurize the filtered salt water from the sand filter to the reverse osmosis membranes to produce potable water. The wave action on the articulated barge effects shaking of the reverse osmosis membranes, thereby rendering them self-cleaning. The
(Continued)

potable water can be used for various applications, e.g., bottling, replenishing aquifers, ground and/or aquifer remediation, irrigation, etc.

10 Claims, 9 Drawing Sheets

Related U.S. Application Data 18, 2014, which is a continuation of application No. 14/037,684, filed on Sep. 26, 2013, now Pat. No. 8,778,176, which is a continuation-in-part of application No. 13/929,171, filed on Jun. 27, 2013, now Pat. No. 8,784,653.

(60) Provisional application No. 61/668,213, filed on Jul. 5, 2012, provisional application No. 62/028,895, filed on Jul. 25, 2014.

(51) Int. Cl.
*C02F 1/44* (2006.01)
*E03B 3/04* (2006.01)
*B01D 61/02* (2006.01)
*B01D 61/04* (2006.01)
*B01D 65/08* (2006.01)
*B63B 35/44* (2006.01)
*F03B 13/14* (2006.01)
*C02F 103/08* (2006.01)

(52) U.S. Cl.
CPC .............. *F03B 13/14* (2013.01); *B01D 61/04* (2013.01); *B01D 2311/04* (2013.01); *B01D 2311/2649* (2013.01); *B01D 2313/36* (2013.01); *B01D 2321/20* (2013.01); *B09C 1/002* (2013.01); *C02F 1/281* (2013.01); *C02F 2103/08* (2013.01); *C02F 2201/008* (2013.01); *C02F 2201/009* (2013.01); *C02F 2303/16* (2013.01); *E03B 3/04* (2013.01); *Y02E 10/38* (2013.01)

(56) References Cited

U.S. PATENT DOCUMENTS

| | | |
|---|---|---|
| 1,078,323 A | 11/1913 | Trull |
| 1,636,447 A | 7/1927 | Standish |
| 2,731,799 A | 1/1956 | Lange et al. |
| 3,022,632 A | 2/1962 | Parks |
| 3,191,202 A | 6/1965 | Handler |
| 3,376,588 A | 4/1968 | Berteaux |
| 3,628,334 A | 12/1971 | Coleman |
| 3,755,836 A | 9/1973 | Milazzo |
| 3,818,523 A | 6/1974 | Stillman, Jr. |
| 3,846,990 A | 11/1974 | Bowley |
| 3,848,419 A | 11/1974 | Bowley |
| 4,004,308 A | 1/1977 | Gongwer |
| 4,048,802 A | 9/1977 | Bowley |
| 4,077,213 A | 3/1978 | Hagen |
| 4,098,084 A | 7/1978 | Cockerell |
| 4,118,932 A | 10/1978 | Sivill |
| 4,209,283 A | 6/1980 | Marbury |
| 4,210,821 A | 7/1980 | Cockrell |
| 4,255,066 A | 3/1981 | Mehlum |
| 4,264,233 A | 4/1981 | McCambridge |
| 4,280,238 A | 7/1981 | van Heijst |
| 4,326,840 A | 4/1982 | Hicks et al. |
| 4,335,576 A | 6/1982 | Hopfe |
| RE31,111 E | 12/1982 | Hagen |
| 4,408,454 A | 10/1983 | Hagen et al. |
| 4,421,461 A | 12/1983 | Hicks et al. |
| 4,512,886 A | 4/1985 | Hicks et al. |
| 4,686,377 A | 8/1987 | Gargos |
| 4,698,969 A | 10/1987 | Raichlen et al. |
| 4,781,023 A | 11/1988 | Gordon |
| 4,894,873 A | 1/1990 | Kiefer et al. |
| 4,954,110 A | 9/1990 | Warnan |
| 5,112,483 A | 5/1992 | Cluff |
| 5,132,550 A | 7/1992 | McCabe |
| 5,186,822 A | 2/1993 | Tzong et al. |
| 5,359,229 A | 10/1994 | Youngblood |
| 5,558,459 A | 9/1996 | Odenbach et al. |
| 5,879,105 A | 3/1999 | Bishop et al. |
| 6,406,221 B1 | 6/2002 | Collier |
| 6,451,204 B1 | 9/2002 | Anderson |
| 6,476,511 B1 | 11/2002 | Yemm et al. |
| 6,647,716 B2 | 11/2003 | Boyd |
| 6,863,806 B2 | 3/2005 | Stark et al. |
| 7,023,104 B2 | 4/2006 | Kobashikawa |
| 7,042,112 B2 | 5/2006 | Wood |
| 7,245,041 B1 | 7/2007 | Olson |
| 7,264,420 B2 | 9/2007 | Chang |
| 7,443,047 B2 | 10/2008 | Ottersen |
| 7,579,704 B2 | 8/2009 | Steenstrup et al. |
| 7,658,843 B2 | 2/2010 | Krock et al. |
| 7,694,513 B2 | 4/2010 | Steenstrup et al. |
| 7,728,453 B2 | 6/2010 | Evans |
| 7,900,571 B2 | 3/2011 | Jaber et al. |
| 8,564,151 B1 | 10/2013 | Huenber |
| 8,650,869 B1 | 2/2014 | McCormick |
| 8,778,176 B2 | 7/2014 | Murtha et al. |
| 8,784,653 B2 | 7/2014 | Murtha et al. |
| 8,866,321 B2 | 10/2014 | McCormick et al. |
| 2003/0010691 A1 | 1/2003 | Broussard |
| 2003/0121408 A1 | 7/2003 | Linerode et al. |
| 2006/0012871 A1 | 6/2006 | Dyhrberg |
| 2006/0283802 A1 | 12/2006 | Gordon |
| 2007/0108112 A1 | 5/2007 | Jones et al. |
| 2007/0200353 A1 | 8/2007 | Ottersen |
| 2009/0084296 A1 | 4/2009 | McCormick |
| 2010/0054961 A1 | 3/2010 | Palecek et al. |
| 2010/0320759 A1 | 12/2010 | Lightfoot et al. |
| 2011/0121572 A1 | 5/2011 | Levchets et al. |
| 2011/0299927 A1 | 12/2011 | McCormick et al. |
| 2012/0025532 A1 | 2/2012 | Song |
| 2012/0067820 A1 | 3/2012 | Henthorne et al. |
| 2013/0008158 A1 | 1/2013 | Hon |
| 2013/0008164 A1 | 1/2013 | Cunningham et al. |

FOREIGN PATENT DOCUMENTS

| | | |
|---|---|---|
| DE | 2248260 | 4/1974 |
| FR | 2437507 | 4/1980 |
| GB | 2113311 | 8/1983 |
| GB | 2459112 | 10/2009 |
| JP | 2002142498 | 5/2002 |
| KR | 20110020077 | 3/2011 |
| WO | WO 95/10706 | 4/1995 |
| WO | WO 01/96738 | 12/2001 |
| WO | WO 03/026954 | 4/2003 |

OTHER PUBLICATIONS

Blevins, Robert D., "Flow-Induced Vibrations," Van Nostrand Reinhold, New York, 1990, pp. 194-213.

Budar, et al., "A Resonant Point Absorber of Ocean-Wave Power," Nature, vol. 256, Aug. 1975, pp. 478-480.

Cébron, et al., "Vortex-Induced Vibrations Using Wake Oscillator Model Comparison on 2D Response with Experiments," Institute of Thermomechanics, Prague, 2008.

Falnes, Johannes, "Ocean Waves Oscillating Systems," Cambridge University Press, pp. 196-224, 2002.

Farshidianfar, et al., "The Lock-in Phenomenon in VIV Using a Modified Wake Oscillator Model for Both High and Low Mass-Damping Ratio," Iranian Journal of Mechanical Engineering, vol. 10, No. 2, Sep. 2009.

Garnaud, et al, "Comparison of Wave Power Extraction by a Compact Array of Small Buoys and by a Large Buoy," Proceedings of the 8th European Wave and Tidal Energy Conference, Uppsala, Sweden, 2009, pp. 934-942.

(56) References Cited

OTHER PUBLICATIONS

Jauvitis, et al., 37 The Effect of Two Degrees of Freedom on Vortex-Induced Vibration at Low Mass and Damping,: J. Fluid Mechanics, vol. 509, 2004, pp. 23-62.
Lee et al., "On the Floating Breakwater—A New Arrangement," Proceedings, International Conf. on Coastal Engineering, Taipei, 1986, pp. 2017-2022.
Leong, et al., "Two-Degree-of-Freedom Vortex-Induced Vibration of a Pivoted Cylinder Below Critical Mass Ratio," Proceedings of the Royal Society A, vol. 464, 2008, pp. 2907-2927.
Liang et al., "A Study of Spar Buoy Floating Breakwater," Ocean Engineering, vol. 31, 2004, pp. 43-60.
McCormick, et al., "Full-Scale Experimental Study of Bi-Modal Buoy," Report EW 01-11, Department of Naval Architecture and Ocean Engineering, U.S. Naval Academy, Jun. 2011, 32 pages.
McCormick, et al., "Planing Characteristics of Fast-Water Buoys," Journal of the Waterways Harbors and Coastal and Engineering Division, vol. 99, No. WW4, Nov. 1973, pp. 485-493.
McCormick, et al., "Prototype Study of a Passive Wave-Energy Attenuating Bi-Modal Buoy," Murtech, Inc. Report M-12-1, Jan. 2012, 26 pages.
Miles, John W., "On the Interference Factors for Finned Bodies," J. Aeronautical Sciences, vol. 19, No. 4, Apr. 1952, p. 287.
Murali, et al., "Performance of Cage Floating Breakwater," Journal of Waterway, Port, Costal and Ocean Engineering, Jul./Aug. 1997, pp. 1-8.
Ng, et al., "An Examination of Wake Oscillator Models for Vortex-Induced Vibrations," Naval Undersea Warfare Center Division, Newport, RI, Technical Report 11,298, Aug. 1, 2011, 18 pages.
Ogink, et al., "A Wake Oscillator With Frequency Dependent Coupling for the Modeling of Vortex-Induced Vibration," Journal of Sound and Vibration, No. 329, 2010, pp. 5452-5473.
Rodenbusch, George, "Response of a Pendulum Spar to 2-Dimensional Random Waves and a Uniform Current," Massachusetts Institute of Technology and Woods Hole Oceanographic Institution, Engineering Program, Ph.D. Dissertation, Aug. 1978, 138 pages.
Ryan, et. al., "Energy Transfer in a Vortex Induced Vibrating Tethered Cylinder System", Conf. on Bluff Body Wakes and Vortex-Induced Vibrations, Port Douglas, Australia, Dec. 2002, 4 pages.
Shiguemoto, et al., "Vortex Induced Motions of Subsurface Buoy with a Vertical Riser: A Comparison Between Two Phenomenological Models" Proceedings, 23° Congresso Nacional de Transporte Aquaviário, Construção Naval e Offshore, Rio de Janeiro, Oct. 25-29, 2010, pp. 1-9.
Sobey, et al., "Hydrodynamic of Circular Piles," Proceedings, 6th Australian Hydraulics and Fluid Mechanics Conference, Adelaide, Dec. 1977, pp. 253-256.
Long Beach Water Department, Under-Ocean Floor Seawater intake and Discharge Test Plan, Apr. 1, 2009.
Lovo, Robert, "Initial Evaluation of the Subfloor Water Intake Structure System (SWISS) vs. Conventional Multimedia Pretreatment Techniques," Assistance Agreement No. 98-FC-81-0044, Desalination Research and Development Program Report No. 66, U.S. Dept. of Interior, May 2001.
McCormick, "Ocean Wave Energy Conversion," Wiley-Interscience, New York (1981, reprinted by Dover Publication, Long Island, New York in 2007).
WateReuse Association, "Overview of Desalination Plan Intake Alternatives", Mar. 2011.
Glenn, et al., "Irrigating Crops with Seawater", Scientific American, Aug. 1998, pp. 76-81.
International Search Report for related PCT Application No. PCT/US2013/048906 dated Sep. 30, 2013.
International Search Report for corresponding PCT Application No. PCT/US2014/056243 dated Dec. 15, 2014.
International Seach Report for corresponding PCT Application No. PCT/US2016/022438 dated Jun. 21, 2016.
International Search Report for related PCT Application No. PCT/US2013/059175 dated Mar. 19, 2014.

DAMPING PLATE SAND FILTRATION SYSTEM AND WAVE ENERGY WATER DESALINATION SYSTEM AND METHODS OF USING POTABLE WATER PRODUCED BY WAVE ENERGY DESALINATION

CROSS-REFERENCE TO RELATED APPLICATIONS

This Continuation-in-Part application claims the benefit under 35 U.S.C. § 120 of application Ser. No. 15/023,791 filed on Mar. 22, 2016 which claims the benefit under 35 U.S.C. § 371 of PCT Application No. PCT/US2014/056243 filed on Sep. 18, 2014 which claims the benefit under 35 U.S.C. § 120 of application Ser. No. 14/037,684 (now U.S. Pat. No. 8,778,176) filed on Sep. 26, 2013 and entitled "Modular Sand Filtration-Anchor System and Wave Energy Water Desalination System Incorporating the Same" which in turn is a Continuation-in-Part Application, and claims the benefit under 35 U.S.C. § 120, of application Ser. No. 13/929,171 (now U.S. Pat. No. 8,784,653) filed on Jun. 27, 2013 and entitled "Modular Sand Filtration-Anchor System and Wave Energy Water Desalination System Incorporating the Same" which in turn takes the benefit under 35 U.S.C. § 119(e) of Application Ser. No. 61/668,213 filed on Jul. 5, 2012 entitled "Modular Sand Filtration-Anchor System" and all of whose entire disclosures are incorporated by reference. PCT Application No. PCT/US2014/056243 filed on Sep. 18, 2014 also claims the benefit under 35 U.S.C. § 119(e) of application Ser. No. 62/028,895 filed on Jul. 25, 2014 and entitled "Methods of Using Potable Water Produced by Wave Energy Desalination" and whose entire disclosure is also incorporated by reference herein.

BACKGROUND OF THE INVENTION

The present invention is generally directed to the generation of potable water. More particularly, the present invention is directed to articulated wave energy conversion system (AWECS) with reverse osmosis (RO) membranes to generate potable water for various applications.

Desalinization plants are located around the world, and are operated using electricity to pressurize the incoming source water. Depending on the location, there may be pretreatment requirements to optimize the influent for processing through the RO membranes.

The U.S. Department of Interior (DOI) funded the Sub-floor Water Intake Structure System (SWISS), currently utilized in desalination plants in California and Japan. The SWISS approach is to install a permanent subfloor well/intake system for the source-water for the traditional shore structures. The in-situ sand provides the filtration media. See, for example, Lovo, Robert, "Initial Evaluation of the Subfloor Water Intake Structure System (SWISS) vs. Conventional Multimedia Pretreatment Techniques," Assistance Agreement No. 98-FC-81-0044, Desalination Research and Development Program Report No. 66, U.S. Dept. of Interior, May 2001.

Ocean wave-energy conversion is directed to the exploitation of ocean wave energy to produce energy in one or more of four forms, those being hydraulic, pneumatic, mechanical or electrical. See McCormick, "Ocean Wave Energy Conversion," published by Wiley-Interscience, New York (1981, reprinted by Dover Publication, Long Island, N.Y. in 2007). The articulated-barge wave-energy conversion system dates back to the 1970's when both Sir Christopher in the United Kingdom and Glen Hagen of the United States suggested the system. The system was studied in the late 1970's by P. Haren (1978) at MIT. He found that the optimum articulated-barge configuration was a three-barge system. In the 1980's, Dr. Peter McCabe showed that the efficiency of the three-barge system could be substantially improved by suspending an inertial-damping plate below the center barge. Dr. McCabe, then, produced a prototype of the system, coined the McCabe Wave Pump (MWP), which was deployed and studied in the Shannon Estuary for approximately nine years. See, U.S. Pat. No. 5,132,550 (McCabe). The MWP was primarily designed as a producer of potable water.

U.S. Patent Publication No. 2009/0084296 (McCormick), which is incorporated by reference herein, describes a system directed to a wave-powered device having enhanced motion. In particular, there is disclosed an articulated barge wave energy converter system, which shall hereinafter be referred to as the AWECS. See also U.S. Pat. No. 8,193,651 (Lightfoot, et al.). The AWECS basically comprises a forward barge, a rear barge and an intermediate or center barge, all of which arranged to float on a body of water having waves. The barges are hingedly coupled together so that they can articulate with respect to each other in response to wave motion. The AWECS also includes high-pressure pumps which straddle and pivotably connect the barge-pairs, e.g., at least one pump connects the forward barge and the intermediate barge, and at least another pump connects the rear barge and the intermediate barge. The pumps are designed to draw in the water through a pre-filter, pressurize the water, and deliver the water to an on-board reverse osmosis (RO) desalination system. That system includes an RO membrane. As an incoming wave makes contact with the forward barge first, the hydraulic fluid in the pump(s) coupled between the forward barge and the center barge are driven in a first direction; as the wave continues, the hydraulic fluid in the pump(s) coupled between the rear barge and the center barge are driven in a second opposite direction. The end results are bi-directional hydraulic pumps.

In U.S. Pat. No. 8,866,321 (McCormick, et al.), there is disclosed an AWECS arranged for producing electrical energy from the wave energy. To that end it makes use of an AWECS similar to that described above, except that it can make use of a commercially-available rotary-vane pump to drive a generator to produce the electricity. To that end, the invention of the '575 Application entails a floating device having a first portion (e.g., a first barge) movably coupled (e.g., hinged) to a second portion (e.g., a second barge); at least one hydraulic or pneumatic pump (e.g., a linear pump) coupled between the first portion the said second portion, the hydraulic pump driving a hydraulic fluid therein when the first portion moves with respect to the second portion due to wave energy. A fluid rectifier is provided in the AWECS and is in fluid communication with the at least one hydraulic or pneumatic pump, that generates a unidirectional hydraulic or pneumatic fluid flow. A rotary vane pump is coupled to the fluid rectifier. The rotary vane pump uses the unidirectional flow to generate a rotational motion via a drive member. A rotating electrical generator (e.g., a DC generator) is coupled to that drive member, so that the drive member causes the rotating electrical generator to generate electricity when the drive member is rotating.

In U.S. Pat. No. 8,784,653 (Murtha, et al.) and U.S. Pat. No. 8,778,176 (Murtha, et al.) there is disclosed an AWECS arranged for producing potable water from sea water. To that end, it makes use of an AWECS similar to that described above. The systems disclosed therein utilize a plurality of filter-anchors positioned on the sea floor to pre-filter the sea water which is then fed to reverse-osmosis (RO) membranes onboard the AWECS by pump action. The filter-anchors include a filter housing with an interior chamber, an inlet, an outlet and a filter and coupled to each other through a manifold, located within the filter housing.

So while the devices of the aforementioned patents and publications are suitable for their intended purposes, they nevertheless leave something to be desired. For example, it may be undesirable in certain circumstances to have a plurality of filters on the sea floor and to thereby reduce the "footprint" on the sea floor. Thus, a need exists for an apparatus and method of use which overcome the drawbacks of the prior art. The subject invention addresses that need.

All references cited herein are incorporated herein by reference in their entireties.

BRIEF SUMMARY OF THE INVENTION

A system for producing a pressurized water source from a body of water having waves (e.g., salt water, fresh water) is disclosed. The system comprises: an articulated barge system for floating on the body of water having waves, wherein the barge system comprises at least two barges that articulate with respect to each other and which are hinged together, and wherein one of the at least two barges comprises a damping plate positioned thereunder; a filter (e.g., porous bag filled with sand) positioned on the damping plate for filtering water drawn from the body of water having waves into the filter; at least one pump (e.g., a bi-directional linear pump) in fluid communication with the filter and wherein the at least one pump straddles the at least two barges such that articulation of the at least two barges in response to the action of the waves converts energy of the waves into driving the at least one pump to cause the at least one pump to draw in water from the body of water through the filter and to form the pressurized water source from the filtered water; and at least one anchor for placement on a bed of the body of water to anchor the articulated barge system.

A system for producing a pressurized water source from a body of water having waves (e.g., salt water, fresh water) is disclosed. The system comprises: an articulated barge system for floating on the body of water having waves, wherein the barge system comprises at least two barges that articulate with respect to each other and which are hinged together; a filter (e.g., porous bag filled with sand) positioned on a bed in the body of water for filtering water drawn from the body of water having waves into the filter; at least one pump (e.g., a bi-directional linear pump) in fluid communication with the filter and wherein the at least one pump straddles the at least two barges such that articulation of the at least two barges in response to the action of the waves converts energy of the waves into driving the at least one pump to cause the at least one pump to draw in water from the body of water through the filter and to form the pressurized water source from the filtered water; and at least one anchor for placement on a bed of the body of water to anchor the articulated barge system.

A method for producing a pressurized water source from a body of water (e.g., salt water, fresh water) having waves is disclosed. The method comprises: providing an articulated barge system adapted for flotation on the body of water having waves, the barge system including at least two barges that articulate with respect to each other and which are hinged together wherein one of the at least two barges comprises a damping plate positioned thereunder and submerged in the body of water; anchoring the articulated barge system in the body of water; positioning a filter (e.g., porous bag filled with sand) on the damping plate for filtering water drawn from the body of water into the filter; positioning at least one pump (e.g., a bi-directional linear pump) to straddle the at least two barges and coupling the at least one pump to be in fluid communication with the filter; and allowing the at least two barges to articulate in response to the action of the waves which converts energy of the waves into driving the at least one pump to cause the at least one pump to draw in water from the body of water through the filter and to form the pressurized water source from the filtered water.

A method for producing a pressurized water source from a body of water having waves (e.g., salt water, fresh water) is disclosed. The method comprises: providing an articulated barge system adapted for flotation on the body of water having waves, the barge system includes at least two barges that articulate with respect to each other and which are hinged together; anchoring the articulated barge system in the body of water; positioning a filter (e.g., porous bag filled with sand) on a bed in the body of water for filtering water drawn from the body of water into the filter; positioning at least one pump (e.g., a bi-directional linear pump) to straddle the at least two barges and coupling the at least one pump to be in fluid communication with the filter; and allowing the at least two barges to articulate in response to the action of the waves which converts energy of the waves into driving the at least one pump to cause the at least one pump to draw in water from the body of water through the filter and to form the pressurized water source from the filtered water.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
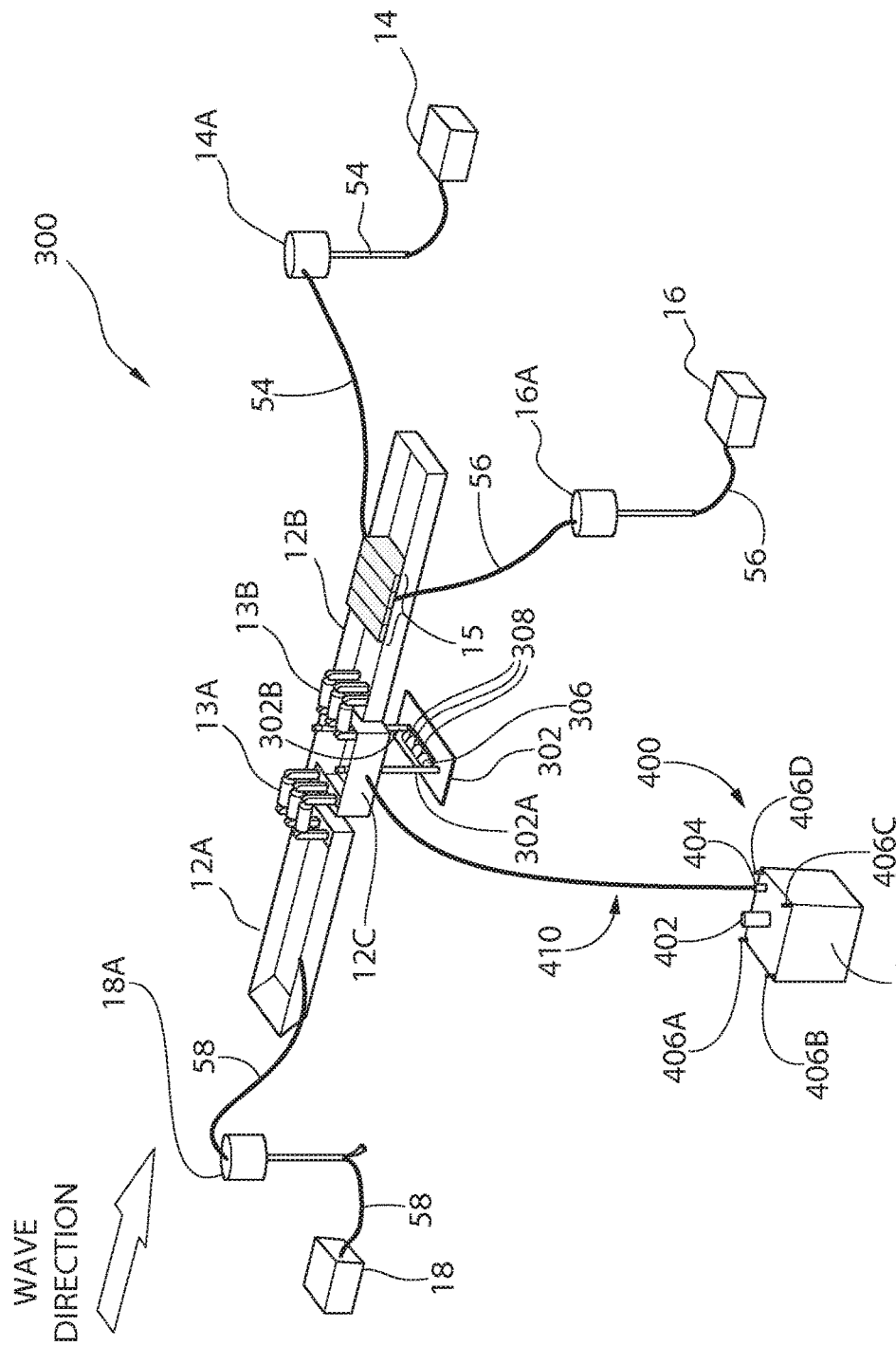
FIG. 1 is a simplified schematic diagram of an articulated wave energy conversion system and a sand filtration system in accordance with an exemplary embodiment of the present invention.

Referring now to the drawing wherein like characters refer to like parts, there is shown in FIG. 1 a system 300 for producing potable water from salt water in a body of water, e.g., a sea, having waves. The system 300 basically comprises an AWECS and a portable filtration system. The AWECS is a system in the form of articulated barge and includes a desalination system. The desalination system is constructed similarly to the AWECS described above, e.g., it includes a forward barge 12A, a rear barge 12B and an intermediate or center barge 12C. The barges are hinged to each other and include at least one pump 13A straddling the forward barge 12A and center barge 12C and at least one pump 13B straddling the rear barge 12B and center barge 12C. The center barge 12C comprises a damping plate 302 located beneath the center barge 12 via two struts 302A and 302B. The damping plate 302 lowers the center of gravity of the AWECS which increases the stability of the vessel (e.g., similar to the keel of a sailboat). It is on this damping plate 302 that a sand filtration system 304 is releasably secured. As will be discussed in detail later, the sea water is passed through this sand filtration unit 304 and the filtered sea water output of the system 304 is then pumped up into the desalination system on the AWECS.

The onboard desalination system comprises reverse osmosis membranes (not shown) which are positioned in a plurality of canisters (also not shown) located in each of a plurality of modules 15 (e.g., four modules by way of example only). The reverse osmosis membranes are arranged to process filtered salt water provided from the sand filtration system 304 to produce potable water. Thus, unlike the portable filtration-anchor system of U.S. Pat. No. 8,784,653 (Murtha, et al.) and U.S. Pat. No. 8,778,176 (Murtha, et al.), the sand filtration system 304 is arranged for positioning on the damping plate 302 of the center barge 12C, thereby avoiding sand filters being placed on the seafloor. Power for drawing the salt water from the body of water into the sand filtration system 304, where it is filtered into filtered salt water, and for providing the filtered salt water to the desalination system on the articulated barge system is accomplished by the action of the waves of the body of water on the barge system. In particular, as will be discussed in detail later, the AWECS includes pumps which are powered by the energy extracted from the action of the waves on the barge system.

The system for producing potable water will be illustrated in more detail with reference to the following embodiments, but it should be understood that the present invention is not deemed to be limited thereto. To that end, one exemplary embodiment of an AWECS 300 constructed in accordance with an exemplary embodiment of the present invention is shown in FIG. 1 and includes the three previously identified articulated barges 12A, 12B and 12C. Using a three-point anchoring system, the barges 12A-12C are anchored using anchors 14, 16 and 18 along with associated mooring buoys 14A, 16A, 18A. The mooring buoys 14A, 16A and 18A are attached to their respective anchors 14, 16 and 18 via cables/lines 54, 56 and 58, respectively. The mooring buoys 14A-18A provide "slack" to permit the anchors to be positioned without interfering or otherwise reducing the articulation of the barges.

Figure 2:
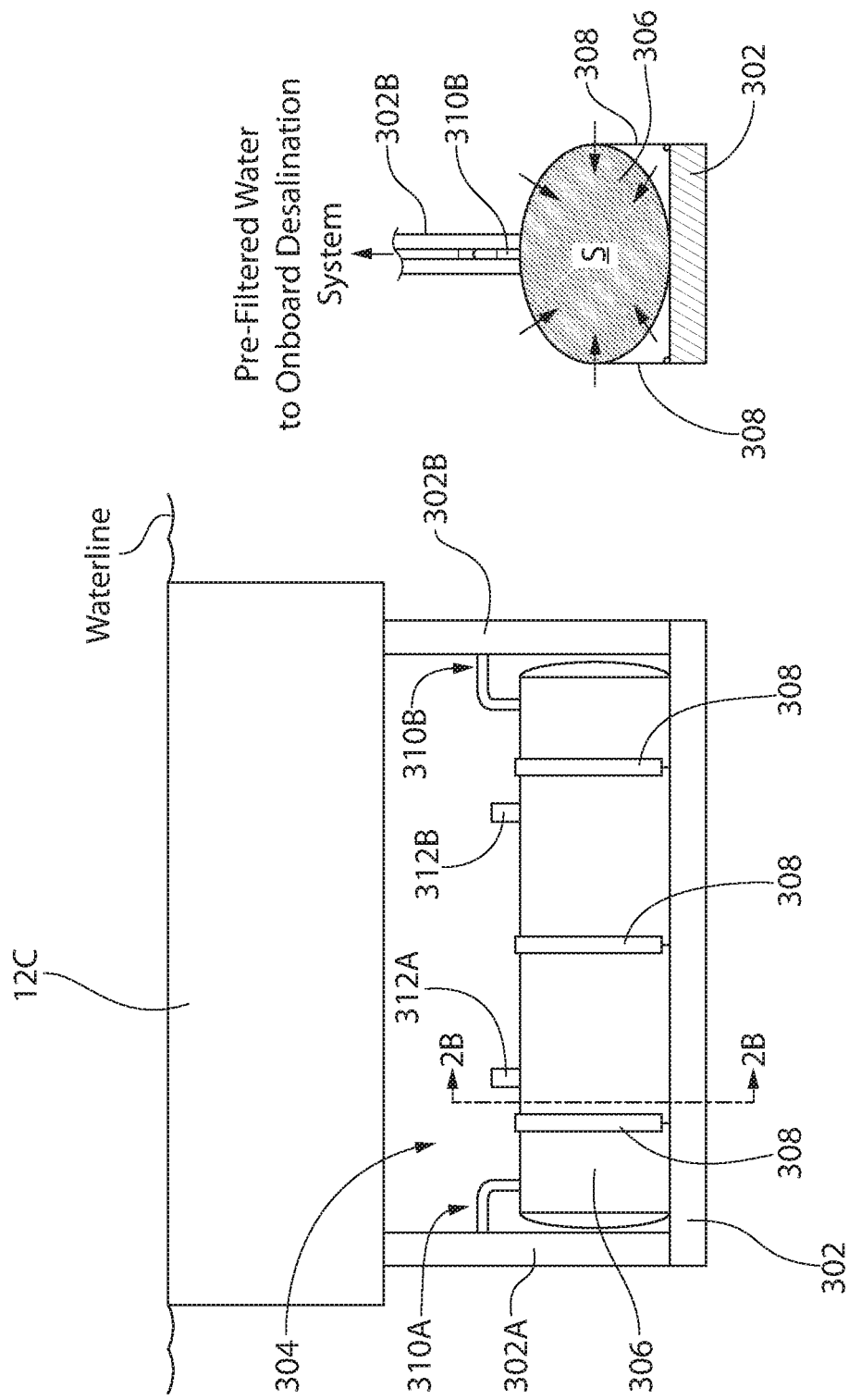
FIG. 2A is a transverse view of the center barge showing the sand filtration system on the damping plate.
FIG. 2B is a transverse view of the sand filtration system taken along 2B-2B of FIG. 2A.

As shown most clearly in FIGS. 2A-2B is the sand filtration system 304. The sand filtration system 304 comprises a large porous bladder 306 filled with sand. The bladder 306 comprises a porous fabric such as a woven geotextile bag (e.g., a Geotube® brand permeable fabric, e.g., polyethylene, woven fabric) filled with sand S. Seam strength may be, for example, approximately 450 pounds per inch pull. The permeability of the geotextile is in gallons per square feet. It is not the restricting permeability of the system 300. As an alternative to a bag 306, a porous cover, formed of the same material as the bag 306, may be provided over the body of sand. The bag 306 (or a porous cover formed of the same material as the bag) serves to keep the sand S from washing from the sand filtration system 304. The bladder 306 filled with sand S is releasably secured on the damping plate 302 via any number of means, e.g., using tie-down straps 308. Output conduits 310A and 310B convey the filtered sea water from the bladder 306 up to the desalination system modules 15 for eventual input to the RO membranes via the pump action to be described later. Bladder fill ports 312A and 312B are provided for filling sand into the bladder 306.

The output conduits 310A and 310B may be constructed of, for example, high density polyethylene, and may be encased in filter fabric and stone sleeve to prevent sand S from being pulled into the conduits. The output conduits 310A/310B serve to transport filtered salt water, e.g., sea water, and may comprise, by way of example only, a diameter of six inches. The operation of the AWECS pumps 13A and 13B pulls the filtered sea water from the bladder 306 and up into the RO membranes in the modules 15 of the desalination system in the AWECS. The power for operating the pumps is provided by the wave energy captured by the articulating barges 12A-12C.

The sand S to be used in the bladder 106 is preferably coarse washed sand placed into the geotextile bag 306. The estimated coefficient of permeability (K) of the sand is expected to be between 0.003 and 0.00003 ft/s. Any combination of engineered sand and gravel may be used to obtain best filtering results.

As stated above, the AWECS 300 is designed to be deployed (e.g., floated) in a body of salt water, e.g., sea having, for example, a 1.5-meter significant wave height and seven-second period. However, the AWECS 300 will operate in greater and lesser seas or bodies of salt water, and the potable-water production will vary with the sea/salt water conditions.

For the design sea (for example, a 1.5-meter significant wave height and 7-second period), the exemplary potable water producing system of this invention shown in FIG. 1 and described further below can produce an average of 100,000 gallons per day (gpd) of potable water. This value is based on 200,000 gpd of source water taken in through the sand filtration system. However, it is intended that the AWECS 300 operates in greater and lesser seas, wherein the potable-water production will vary with the sea conditions.

The AWECS is floated and towed to a desired body of salt water (or fresh water) with the filter disposed on the damping plate and both of which are submerged within said desired body of salt water. The anchors 14-16/mooring buoys 14A-18A are deployed once the AWECS 300 has arrived at the desired location in the body of salt water (or fresh water).

As mentioned above, the articulation of the barges 12A-12C causes the at least one pump (13A/13B) to operate to generate a pressurized water source. In particular, as the articulation occurs and due to the fluid connection of the sand filtration system 304 to the at least one pump 13A/13B, a localized suction action is created around the surface of the bladder 306 which draws raw sea water into the bladder 306. This drawn-in sea water passes through the sand content of the bladder 306, thereby filtering out particulates from the sea water. Based on the geometry of the bladder 306, the rate at which the raw sea water is drawn into the bladder 306 complies with U.S. regulations such that the surface intake velocity is less than 0.5 ft/sec; this restricts the incursion of fish larva and macro or micro vertebrae. As a result, the output of the at least one pump 13A or 13B is a pressurized source of filtered sea water. This pressurized water source is then processed through an onboard reverse osmosis system. The onboard reverse osmosis system can be of any suitable construction and includes a conventional reverse osmosis (RO) membranes. The reverse osmosis system operates in a conventional manner to produce potable water from salt water exposed to the RO membrane. However, the fact that the RO membrane is located in the articulated barge system renders it self-cleaning. In this regard, since the barge system is floating on the body of salt water where it is exposed to the rocking action of the waves (an exemplary direction of the wave flow is shown by the arrow in FIG. 1), this rocking action effectively shakes or otherwise disturbs the RO membrane to effectively clean it. Thus, the RO membrane is effectively self-cleaning.

Alternatively, the pressurized source of filtered sea water, rather than being fed to the onboard desalination system 15, may be diverted to irrigating crops that thrive on sea water, such as but not limited to, glasswort species, Palmer's grass, sea blite, saltbush, etc. (see *Irrigating Crops with Seawater*, by Glenn, et al., Scientific American, August 1998, pp. 76-81, and which is incorporated by reference herein). Thus, the present invention 300 may provide an efficient way to support the growing of crops in a desert from the offshore location of the articulating barges 12A-12C.

Another alternative is the placement of the AWECS in a fresh water setting where wave motion in the fresh water environment can generate a pressurized fresh water source also using the operating steps described above for the sea water operation but omitting the desalination processing.

Figure 3:
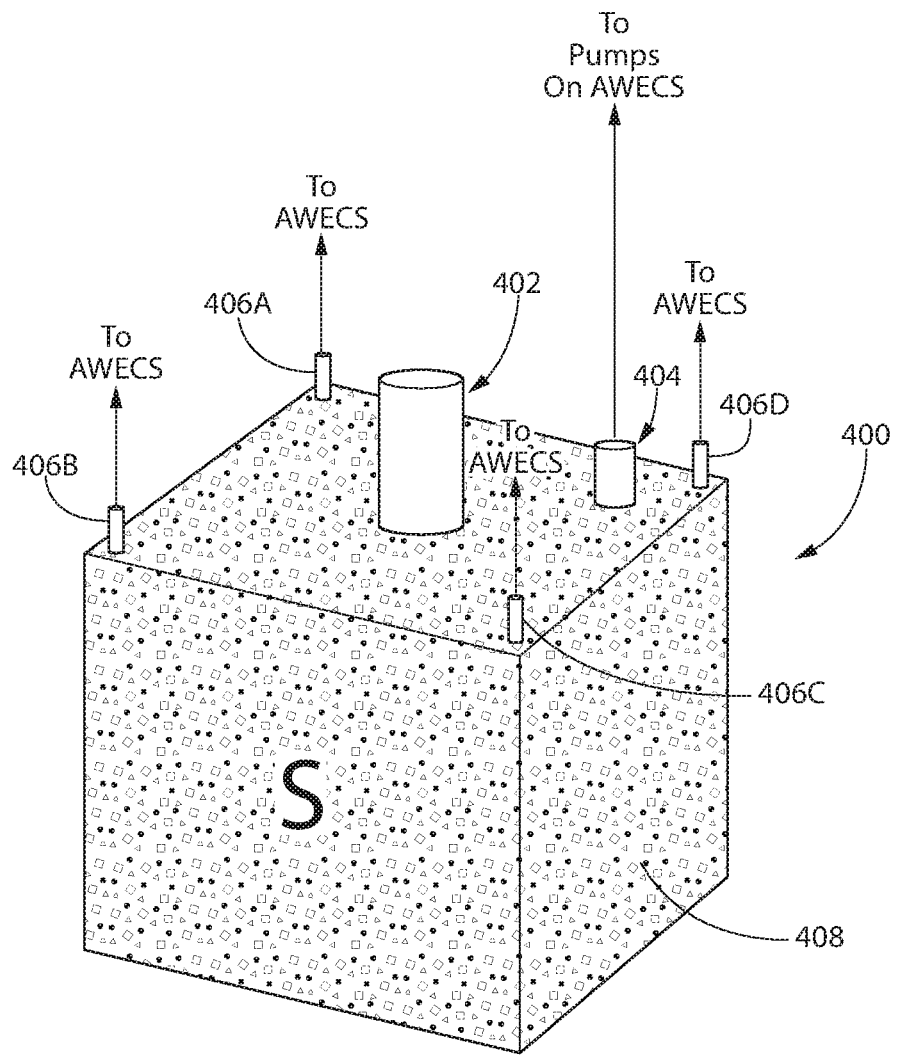
FIG. 3 is an isometric view of an alternative sand filtration system that rests on the sea bed.

As discussed previously, one of the advantages of using the sand filtration system 304 on the damping plate 302 is that this reduces the "footprint" of the AWECS on the sea bed. This ability to have a small footprint or impact on a sea bed is very important because positioning the AWECS is site-specific. In certain locations, the available sea bed for anchoring the AWECS 300 may be very limited. On the other hand, the available sea bed may allow for the placement of a sand filter thereon, in addition to the anchors 14-18. In those sites, where such availability on the sea bed is present, another alternative 400 is shown in FIG. 3. Rather than using the sand filtration system 304 on the damping plate 302, another type of sand filtering system 400 can be positioned on the sea bed.

In particular, the sand filtration system 400 comprises a housing 408 (e.g., a box-shaped style, etc.) comprising a material similar to the bladder 306, e.g., a porous fabric or a porous cover such as a woven geotextile bag (e.g., a Geotube® brand permeable fabric, e.g., polyethylene, woven fabric) filled with sand S. Seam strength may be, for example, approximately 450 pounds per inch pull. Thus, the housing/bag serves to keep the sand S from washing from the sand filtration system 400. The housing 408 filled with sand S via a fill port 402 before it is submerged and placed on the sea bed. Filtered salt water is then conveyed to the AWECS via a vent port 404, through the action of the pumps 13A and 13B, and through an output conduit 410 to the pumps 13A/13B, as discussed previously with regard to the sand filtration system 304. As with the filtration system 304, the pressurized salt water can then be fed to the onboard desalination system modules 15 or to another destination (e.g., irrigating salt water crops, etc.). On respective corners of the housing 408 are straps 406A-406D (shown partially) which are used for submerging and placing the filter 400 or for raising the filter 400. By way of example only, the housing 408 may comprise dimensions of 8 ft×8 ft×6.5 ft. Furthermore, as with the sand filtration system 304, the filter 400 is sized to comply with the surface intake velocity requirement to restrict the incursion of fish larva and macro or micro vertebrae.

In certain environments, it may be possible to utilize both the sand filtration system 304 and the filter system 400 together by providing the proper manifold configuration for inputting the filtered water from each filter 304 and 400.

Figure 4:
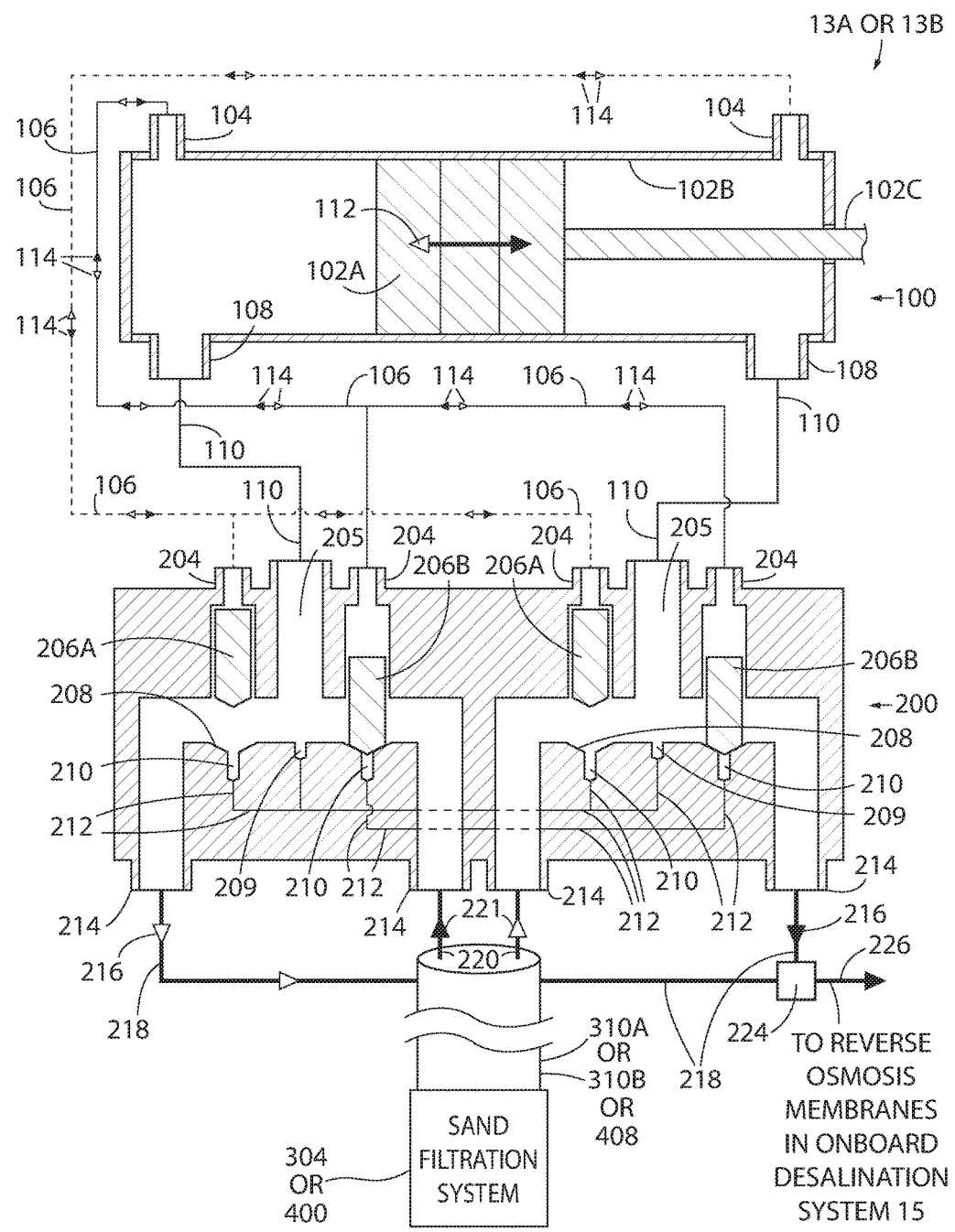
FIG. 4 is a functional diagram of an AWECS pump depicting how a high pressure flow of filtered sea water is generated by wave motion of the barges for provision to RO membranes in the barges to produce potable water thereat.

As mentioned earlier, the AWECS pumps 13A and 13B pull the filtered sea water from the bladder 306 (or filter system 400) to the reverse osmosis membranes in the plurality of modules 15 of the onboard desalination system. As shown most clearly in FIG. 4, an AWECS pump (13A or 13B) comprises a bi-directional linear pump 300 that is powered by the relative motions of the barges 12A/12C or 12B/12C via movable couplings (e.g., hinges). As can be appreciated from FIG. 6, movement of a piston 102A within a piston chamber 102B as driven by a piston rod 102C whose other end (not shown) is coupled to either barge 12A or 12B, causes sea water from a filter-anchor unit to be moved in opposite linear directions. As a result, a "flow rectifier" 200 is required to convert this bi-directional sea water flow into a unidirectional fluid flow. This unidirectional sea water flow is then delivered to the reverse osmosis membranes in the onboard desalination system 15. The housing 102B comprises pressure taps 104 that feed into corresponding pressure tap pairs 204 in the flow rectifier 200 via control pressure lines 106. Intake/Exhaust taps 108 are coupled via intake/exhaust lines 110 respectively to rectifier passageways 205. Rectifier valve pairs 206A and 206B (e.g., cone-head valves) correspond to the pressure tap pairs 204. The valves 206A/206B are received in valve seats 208 when the valves are closed. Pressure relief taps 209 are provided and wherein seat pressure relief taps 210 are coupled via pressure relief lines 212. Flow ports 214 act as the input ports for the sea water and are in fluid communication with a sand filtration system 304. Arrows 112 indicate the corresponding piston motion direction while arrows 114 indicate the pressure-force direction. Arrows 216 indicate the sea water flow direction. The high-pressure sea water feed flow line is indicated by 218 while the low-pressure intake flow line is indicated by 220. A high pressure manifold 222 takes the high-pressure sea water flow via path 224 to the reverse osmosis membranes in the onboard desalination system 15 (or to alternative destinations, e.g., irrigating salt water thriving crops, etc. that can use a pressurized salt water source). Alternatively, when the present invention 300 is used on a body of fresh water, the high pressure manifold 222 forms a high-pressure fresh water flow via path 224.

In operation, the piston/rod assembly 102A/102C is excited by an alternating energy source, namely, the water waves. The piston/rod assembly 102A/102C travels in alternating directions over the period associated with the water wave in the piston housing 102B. The motions create alternating pressures in the taps 104/204 due to the alternating piston-rod assembly motions 112. The alternating pressures are transmitted through the control pressure lines 106, producing alternating pressure forces with directions shown as 114. The piston-rod assembly motions 112 cause the sea water in the pump 100 to be alternatively expelled at high pressure and refilled at low pressure through the intake/exhaust taps 108. The alternating flows through the taps 108 are transmitted through the intake/exhaust lines 110. The pressure forces 114 in the control pressure lines 106 alternately cause the cone-head valves 206A and 206B to open and close. The cone-head of the valves mate with the conical valve seats 208 when the valve is closed. When the valve is to be opened by the pressure force 114, sea water is passed into the seat 208 through the seat pressure relief tap 210 which is partially supplied by the pressure relief tap 209. The taps 209 and 210 are interconnected by the pressure relief lines 212. The resulting flows in the sea water flow ports 214 are in the directions indicated by 220. In particular, the high pressure flow in the high pressure feed flow lines 218 travel in the direction 216. The low pressure flow in the low pressure intake flow lines 220 in the direction 221 come from the onboard desalination system 15. The high pressure flow components through flow lines 218 are combined in a manifold 224 and this combined flow 226 is supplied to the reverse osmosis membranes in the onboard desalination system 15.

Figure 5:
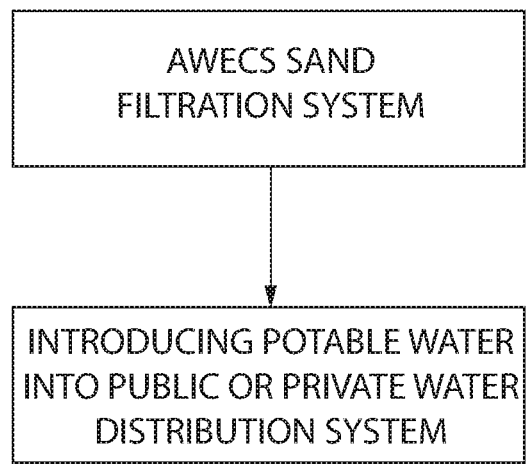
FIG. 5 is a block diagram showing one exemplary method of utilizing potable water produced by the systems of this invention for one desired application, e.g., introducing potable water into a public or private water distribution system.

The potable or pure water produced by the systems of this invention can be utilized in various ways in accordance with various methods of this invention. For example the potable water produced by the systems of this invention can be supplied either directly or indirectly to public or privately owned water distribution systems, such as shown in FIG. 5. That can be accomplished by use of a distribution system including conduits, valves, meters, etc. which couple the AWECS to an inlet of the public or privately owned water distribution system.

Figure 6:
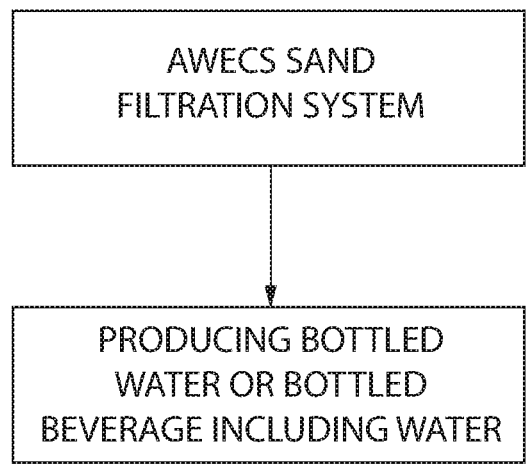
FIG. 6 is a block diagram showing another exemplary method of utilizing potable water produced by the systems of this invention for another desired application, e.g., producing bottled drinking water.

The potable water produced by the systems of this invention can be supplied to water bottlers for the production of bottled drinking water, such as shown in FIG. 6. Alternatively the potable water can be used to supply bottled water for disaster relief applications. For example, the systems of this can be deployed to areas that recently experienced natural or man-made disasters that have rendered the localized water supply inoperable or unsafe, such as Haiti, Fukishima, and other disaster regions that require outside sources of potable water. The systems can then be operated to produce potable water which can be bottled for distribution to the persons affected by the disaster.

Figure 11:
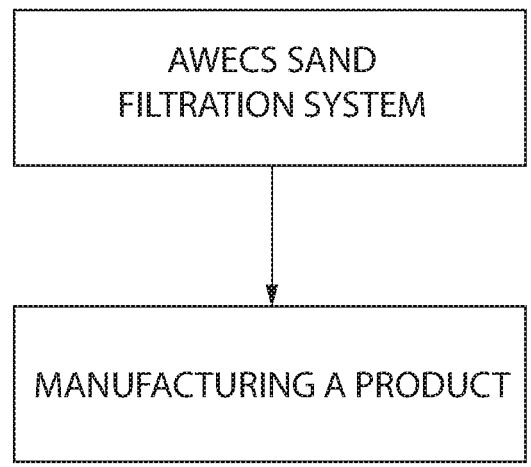
FIG. 11 is a block diagram showing another exemplary method of utilizing potable water produced by the systems of this invention for another desired application, e.g., material manufacturing by providing the potable water for manufacturing a product.
Figure 12:
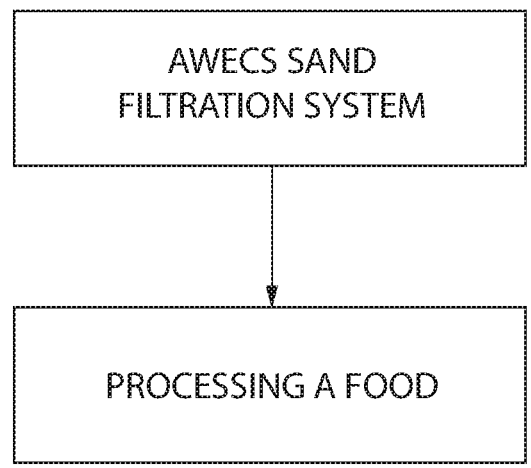
FIG. 12 is a block diagram showing another exemplary method of utilizing potable water produced by the systems of this invention for another desired application, e.g., food processing by providing the potable water for processing a food.

The systems of this invention can also be used in accordance with another method of this invention to serve as a fresh water source for material manufacturing, such as shown in FIG. 11, and food processing, such as shown in FIG. 12, since the water produced by the reverse osmosis system of the AWECS is very pure.

Figure 10:
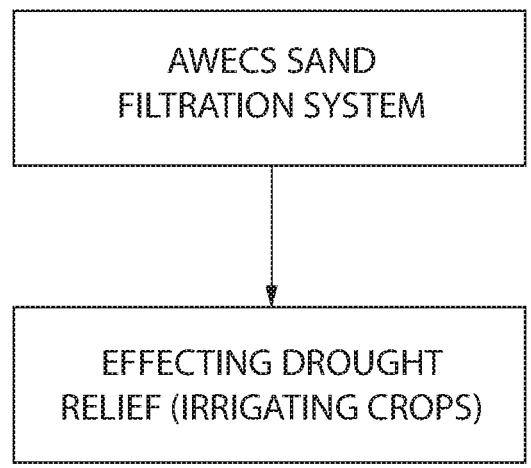
FIG. 10 is a block diagram showing another exemplary method of utilizing potable water produced by the systems of this invention for another desired application, e.g., drought relief by providing the potable water for irrigating crops.

The systems of this invention can be deployed to provide drought relief in accordance with another method of this invention, such as shown in FIG. 10. In particular, there are productive agriculture techniques that use both fresh and salt water to support the growth of the crops. The AWECS can provide either pressurized water source, with salt water pumping into irrigation distribution networks, being a viable capability of the AWECS.

Figure 7:
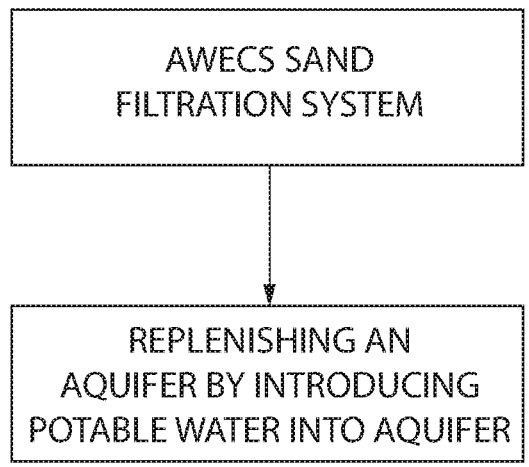
FIG. 7 is a block diagram showing another exemplary method of utilizing potable water produced by the systems of this invention for another desired application, e.g., replenishing an aquifer by introducing the potable water into the aquifer.

The systems of this invention can be deployed for aquifer recharging applications in accordance with still another method of this invention, such as shown in FIG. 7. For example, it is well known that existing water aquifers are being drained at a significant, and perhaps alarming, rate. One of the more publicized examples is in the State of Florida, where the freshwater levels have dropped significantly, creating dangerous sinkholes. The potable water produced by the AWECS can be used to recharge the aquifer and thereby stabilize the sinkhole situation. In fact, the systems of this invention can be used in accordance with methods of this invention to recharge or replenish aquifers for any reason, such as shown in FIG. 7. Such recharging or replenishing could provide a natural and far-reaching water distribution mechanism for regions where the aquifers are in danger.

Figure 8:
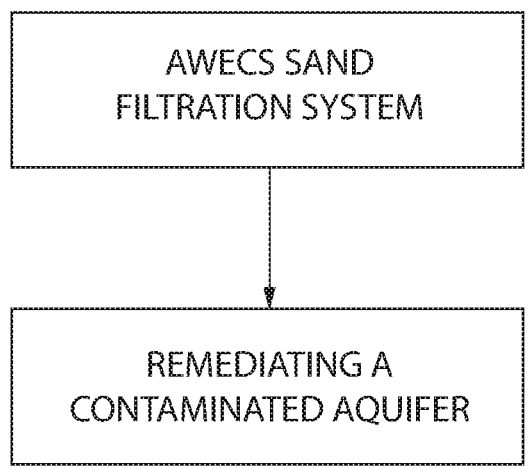
FIG. 8 is a block diagram showing another exemplary method of utilizing potable water produced by the systems of this invention for another desired application, e.g., remediating a contaminated aquifer by introducing the potable water into the aquifer.
Figure 9:
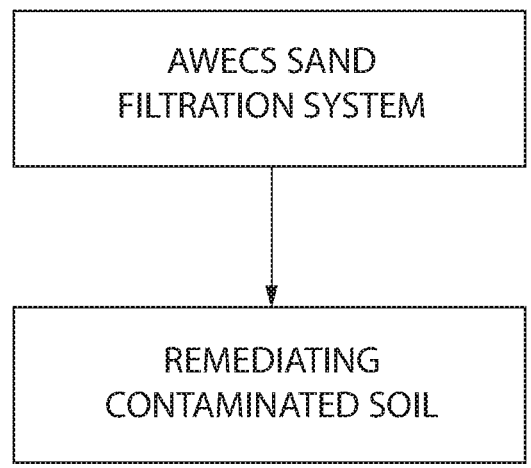
FIG. 9 is a block diagram showing another exemplary method of utilizing potable water produced by the systems of this invention for another desired application, e.g., remediating contaminated soil by introducing the potable water into the soil.

The systems of this invention can be deployed for remediation of aquifer contamination, such as shown in FIG. 8 and/or ground or soil contamination, such as shown in FIG. 9, in accordance with yet other methods of this invention. In this regard, there is a significant issue with ground and/or aquifer contamination that has been plaguing industrial-based societies, where the contamination has occurred many decades into the past but remains extant. Existing techniques for remediation include pumping and treating of the contaminated water, and the infusion of air into the geological substrate to flush out the easily volatilized contaminate. With the production of pure water by the systems of this invention, the infusion of potable water back into the ground can assist in the flushing of the contaminants from the ground, thereby providing a viable and low cost remediation technique.

Figure 13:
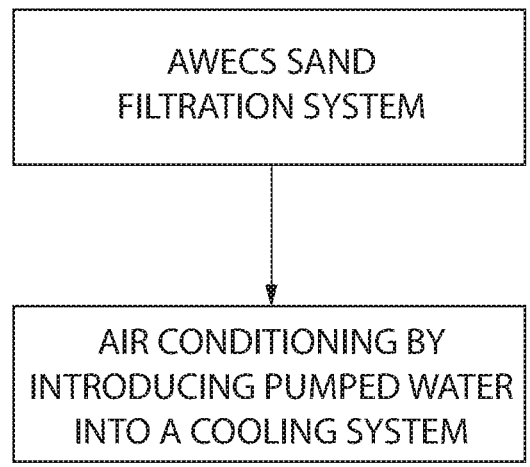
FIG. 13 is a block diagram showing another exemplary method of utilizing water pumped from a body of water utilizing wave action for a desired application, e.g., air conditioning by introducing pumped water into a cooling system.
Figure 14:
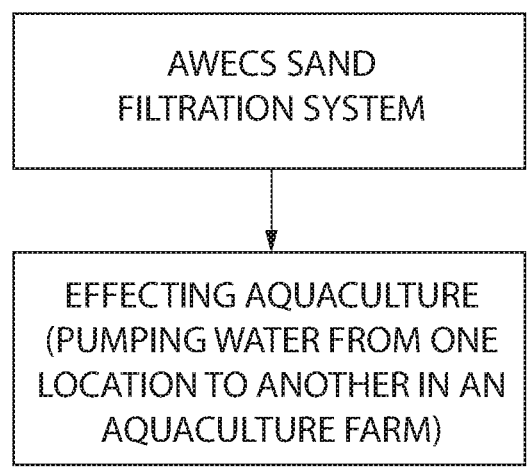
FIG. 14 is a block diagram showing another exemplary method of utilizing water pumped from a body of water utilizing wave action for a desired application, e.g., aquaculture by pumping the water from one location in an aquaculture farm to another location therein to circulate nutrients.

It should be pointed out at this juncture that the AWECS can be used to merely pump seawater without treating that water with reverse osmosis in accordance with another method of this invention. For example, the AWECS can be used, as shown in FIG. 13, for effecting air conditioning by introducing water (salt or fresh) pumped by wave action from a body of water into a cooling system. Alternatively, it can be used, as shown in FIG. 14, in aquaculture farms to pump salt or fresh water from one location to another to circulate nutrients where the temperature gradients create stagnant or oxygen deficient conditions.

While the invention has been described in detail and with reference to specific embodiments thereof and methods of use, it will be apparent to one skilled in the art that various changes and modifications can be made therein without departing from the spirit and scope thereof.

What is claimed is:

1. A system for producing a pressurized water source from a body of water having waves, said system comprising:
    an articulated barge system for floating on the body of water having waves, said barge system comprising at least two barges that articulate with respect to each other and which are hinged together, one of said at least two barges comprising a damping plate positioned thereunder;
    a filter positioned on said damping plate for filtering water drawn from the body of water having waves into said filter;
    at least one bi-directional pump in fluid communication with said filter and wherein said at least one pump is positioned between said at least two barges such that articulation of said at least two barges in response to the action of the waves converts energy of the waves into driving said at least one bi-directional pump in two alternating directions to cause said at least one bi-directional pump to draw in water from said body of water through said filter;
    a flow rectifier coupled to said bi-directional linear pump to produce a unidirectional water flow of said filtered water and to deliver said unidirectional flow of filtered water to form said pressurized water source; and
    at least one anchor for placement on a bed of the body of water to anchor said articulated barge system.

2. The system of claim 1 wherein the body of water is salt water and wherein said system further comprises an onboard desalination system which includes reverse osmosis membranes, said pressurized filtered water being passed through said reverse osmosis membranes for producing potable water from said filtered salt water.

3. The system of claim 2 wherein said reverse osmosis membranes are arranged to be self-cleaned by the action of the waves on the barge system.

4. The system of claim 2 wherein said filter comprises a sand filter, said sand filter comprising a porous bag arranged for holding the sand on said damping plate.

5. The system of claim 1 wherein the body of water comprises a body of fresh water having waves.

6. A system for producing a pressurized water source from a body of water having waves, said system comprising:
    an articulated barge system for floating on the body of water having waves, said barge system comprising at least two barges that articulate with respect to each other and which are hinged together;
    a filter positioned on a bed in the body of water for filtering water drawn from the body of water having waves into said filter;
    at least one pump in fluid communication with said filter and wherein said at least one pump is positioned between said at least two barges such that articulation of said at least two barges in response to the action of the waves converts energy of the waves into driving said at least one pump in two alternating directions to cause said at least one pump to draw in water from said body of water through said filter;
    a flow rectifier coupled to said bi-directional linear pump to produce a unidirectional water flow of said filtered water and to deliver said unidirectional flow of filtered water to form said pressurized water source; and
    at least one anchor for placement on a bed of the body of water to anchor said articulated barge system.

7. The system of claim 6 wherein the body of water is salt water and wherein said system further comprises an onboard desalination system which includes reverse osmosis membranes, said pressurized filtered water being passed through said reverse osmosis membranes for producing potable water from said filtered salt water.

8. The system of claim 7 wherein said reverse osmosis membranes are arranged to be self-cleaned by the action of the waves on the barge system.

9. The system of claim 7 wherein said filter comprises a sand filter, said sand filter comprising a porous bag.

10. The system of claim 6 wherein the body of water comprises a body of fresh water having waves.

* * * * *